(12) United States Patent
Stern et al.

(10) Patent No.: US 10,453,051 B2
(45) Date of Patent: Oct. 22, 2019

(54) SYSTEMS AND METHODS FOR CONTACTLESS AND SECURE DATA TRANSFER

(71) Applicant: CAPITAL ONE SERVICES, LLC, McLean, VA (US)

(72) Inventors: Matthew Stern, San Francisco, CA (US); Jason Deperro, San Mateo, CA (US); Dan Makoski, Palo Alto, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 13 days.

(21) Appl. No.: 15/844,836

(22) Filed: Dec. 18, 2017

(65) Prior Publication Data

US 2018/0108005 A1 Apr. 19, 2018

Related U.S. Application Data (63) Continuation of application No. 14/973,167, filed on Dec. 17, 2015.

(60) Provisional application No. 62/094,701, filed on Dec. 19, 2014.

(51) Int. Cl.
  *G06Q 20/32* (2012.01)
  *G06Q 20/40* (2012.01)
  *G06Q 20/42* (2012.01)

(52) U.S. Cl.
  CPC ....... *G06Q 20/3278* (2013.01); *G06Q 20/401* (2013.01); *G06Q 20/425* (2013.01)

(58) Field of Classification Search
  None
  See application file for complete search history.

(56) References Cited

U.S. PATENT DOCUMENTS

| | | | |
|---|---|---|---|
| 6,494,367 B1 * | 12/2002 | Zacharias | G06Q 20/04 235/379 |
| 2006/0036485 A1 * | 2/2006 | Duri | G06Q 30/02 705/14.25 |
| 2013/0085887 A1 * | 4/2013 | Zhang | G06Q 40/00 705/26.8 |

(Continued)

*Primary Examiner* — Zeshan Qayyum
(74) *Attorney, Agent, or Firm* — Finnegan, Henderson, Farabow, Garrett & Dunner, L.L.P.

(57) ABSTRACT

In one embodiment, a method comprises receiving a unique identifier from an item and sending a communication to an electronic device requesting that a user confirm a pending transaction, receiving input from the electronic device associated, and sending the received input to an authentication system for completing a transaction. In another embodiment, a system comprises a sensor, an authentication system, and a transaction processing system. The sensor is configured to emit energy and receive at least one first identifier, send at least one communication to an electronic device requesting a second identifier, receive at least one second identifier, and send the at least one first identifier and the at least one second identifier to the authentication system. The authentication system is configured to receive the at least one first and second identifiers from the sensor, to choose, based on the at least one first identifier and the at least one second identifier, a transaction processing system, and send the at least one first and second identifiers to the chosen transaction processing system.

20 Claims, 8 Drawing Sheets

(56) References Cited

U.S. PATENT DOCUMENTS

2015/0206117 A1* 7/2015 Govindarajan .... G06Q 20/3278
705/64

* cited by examiner

SYSTEMS AND METHODS FOR CONTACTLESS AND SECURE DATA TRANSFER

RELATED APPLICATIONS

This application is a continuation of U.S. patent application Ser. No. 14/973,167, filed Dec. 17, 2015, which claims priority to U.S. Provisional Application No. 62/094,701 filed Dec. 19, 2014, the disclosures of which are hereby incorporated by reference in their entireties.

BACKGROUND

Typical data transfer systems are cumbersome as they require physical contact between something a first entity has, such as a card, with something that a second entity has, such as a terminal. The first entity typically needs to approach the terminal and pass a magnetic card through a magnetic card reader (also known as "swiping" the card). This causes problems as the first user needs to physically approach the terminal with the card in order to conduct a transaction, which costs time and may dissuade other entities from transferring data if there is a long line at the terminal.

Proposed alternatives such as NFC typically require close contact of the card with the terminal even if there is no "swiping" motion. And some wireless alternatives are insecure in that a nefarious eavesdropper can intercept information needed to accomplish the transaction (such as a card number or identifier) and use it without permission for his own purposes.

Thus, many different types of electronic data transfer systems (e.g., contactless mobile-to-mobile data transfer systems, payment systems, or the like) experience similar issues. There is thus a need to address these and other issues faced by merchants (and other entities) who seek to provide for a n ore secure manner of data transfer. Embodiments of the present disclosure provide technology-based solutions to technology-based problems as well as many other problems. One of ordinary skill will understand from this disclosure that other uses for the presented embodiments are possible as well.

SUMMARY

Disclosed embodiments include methods, systems, and computer-readable media configured to, for example, provide for securely authenticating a payer using wireless technologies, and enabling the payer to pay for goods or transfer funds.

In one aspect, the disclosed embodiments include a method for authenticating a payer. The method comprises receiving, by a sensor, a unique identifier from an item associated with a payer. The item may be, in some embodiments, worn by the payer, inside of the payer's wallet, unpowered, or powered. The method further comprises sending a communication to an electronic device associated with that payer, requesting that the payer confirm that he wishes to proceed with a transaction. The method further comprises receiving input from the electronic device and sending it, along with the unique identifier, to an authentication system to enable the transaction to proceed.

The disclosed embodiments also include a device for authenticating a payer. The device may include a sensor for sending and receiving information wirelessly. The device may also include memory storing software instructions configured to perform a method using one or ore processors. The device may include one or more processors configured to execute the software instructions to perform that method. The method comprises, for example, receiving, by a sensor, a unique identifier from an item associated with a payer. The method further comprises sending a communication to another electronic device associated with that payer, requesting that the payer confirm that he wishes to proceed with a transaction. The method further comprises receiving input from the other electronic device and sending it, along with the unique identifier, to an authentication system to enable the transaction to proceed.

The disclosed embodiments also include an authentication system. The authentication system comprises a storage device comprising instructions and a processor configured to execute the instructions. The processor may execute the instructions to receive the at least one first identifier and the at least one second identifier from the sensor, and choose, based on the at least one first identifier and the at least one second identifier, one of the at least one transaction processing systems. The processor may also execute the instructions to send the at least one first identifier and the at least one second identifier to the chosen transaction processing system in order to accomplish a transaction.

The disclosed embodiments include systems that perform operations consistent with the functionalities exemplified above from the perspective of a financial service provider system, merchant system, consumer mobile device, or other third-party systems distinct from the financial service provider, merchant, and consumer.

Aspects of the disclosed embodiments may include tangible computer-readable media that stores software instructions that, when executed by one or more processors, are configured to and capable of performing and executing one or more of the methods, operations, or the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
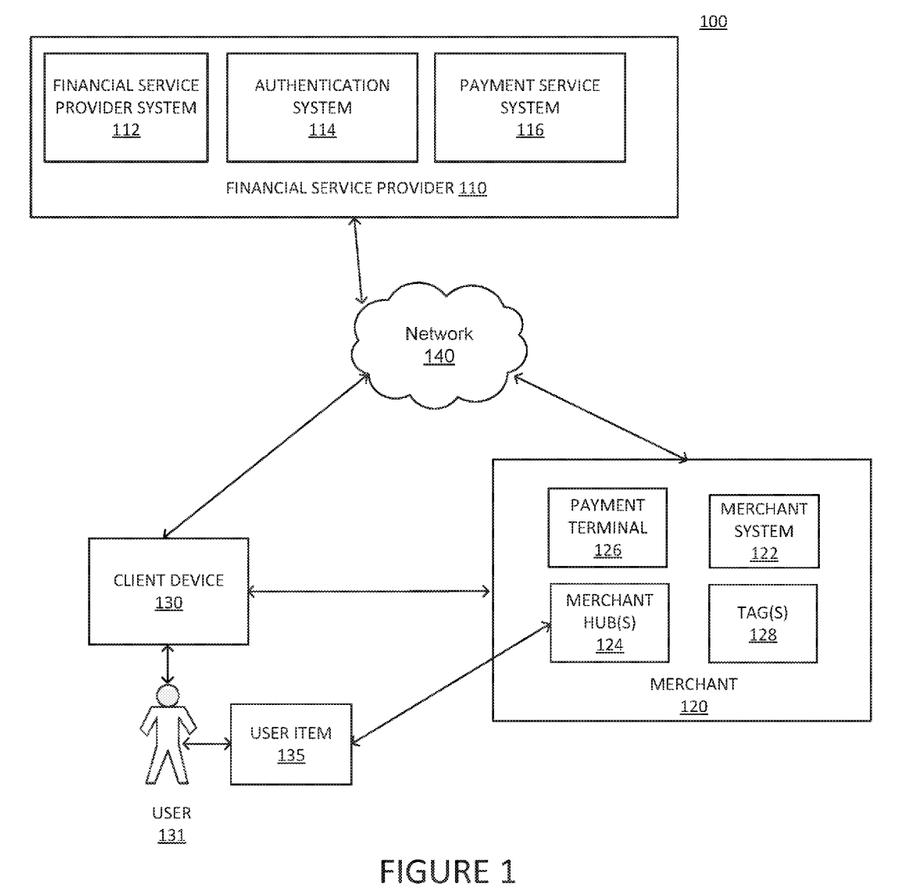
FIG. 1 is a block diagram of an exemplary system, consistent with disclosed embodiments.

FIG. 1 is a block diagram of an exemplary system 100 for performing one or ore operations, consistent with the disclosed embodiments. In one embodiment, system 100 may include one or more financial service providers 110, one or more merchants 120, one or more user devices 130, one or more user items 135, and network 140. The components and arrangement of the components included in system 100 may vary. Thus, system 100 may include other components that perform or assist in the performance of one or more processes consistent with the disclosed embodiments.

Components of system 100 may be computing systems configured to provide systems for enabling secure two-factor authentication systems, consistent with disclosed embodiments. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100, including systems associated with financial service provider 110, merchant 120, client device 130, and/or user item 135. In certain aspects, users may operate one or more components of system 100 to initiate and provide input for one or more operations consistent with the disclosed embodiments.

Financial service provider (FSP) 110 may be an entity that provides, maintains, manages, or otherwise offers financial services. For example, financial service provider 110 may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial service provider system 110 may include infrastructure and components that are configured to generate and/or provide financial service accounts such as credit card accounts, checking accounts, debit card accounts, loyalty or reward programs, lines of credit, or the like. Consistent with certain disclosed embodiments, financial service provider 110, using financial service provider system 112, may provide manufacturer-based financial service accounts, which may be financial service accounts that are associated with a manufacturer of products or services, such as a product manufacturer 120. For example, financial service provider 110 may provide financial services for a credit card account that is branded by an entity, such as a private label credit card branded by a product manufacturer.

FSP 110 may include one or more financial service provider systems 112. In one aspect, FSP system 112 may be one or more computing devices configured to perform one or more operations consistent with disclosed embodiments. In one aspect, financial service provider system 112 may be a desktop computer, a server, or any other type of computing device. Financial service provider system 112 may include one or more processors configured to execute software instructions stored in memory. The one or more processors may be configured to execute software instructions that when executed by a processor performs known Internet-related communication and financial service-based processes. For instance, financial service provider system 112 may execute software that provides data used for generating and displaying interfaces, including content on a display device included in, or connected to, client device 130. In some embodiments, financial service provider 110 may provide one or more web sites or online portals that are accessible by client device 130 and/or merchant 120 over network 140. The disclosed embodiments are not limited to any particular configuration of financial service provider system 112.

Financial service provider 110 may include one or more authentication systems 114. In one aspect, authentication systems 114 may be one or more computing devices configured to perform one or more operations consistent with disclosed embodiments. For example, authentication system 114 may be a desktop computer, a server, or any other type of computing device. Authentication system 114 may include one or more processors configured to execute software instructions stored in memory. The one or more processors may be configured to execute software instructions that when executed by the one or more processors perform known Internet-related communication, database management, financial service-based processes, and/or authentication functions. For instance, authentication system 114 may execute software that provides receives one or more identification items from client device 130 or merchant hub 124, such as a public identifier and a private identifier, and performs a look-up using those identifiers to determine information such as a username, credit card number, checking account number, or the like. As another example, financial service provider system 112 may execute software that provides data used for generating and displaying interfaces, including content on a display device included in, or connected to, client device 130. The disclosed embodiments are not limited to any particular configuration of authentication system 114. Authentication system 114, moreover, need not be part of financial service provider 110 in all embodiments, and could be implemented as a separate system or operated by a separate entity.

Financial service provider 110 may also include one or more payment service systems 116. In one aspect, payment service system 116 may be one or more computing devices configured to perform one or more operations consistent with disclosed embodiments. For example, payment service system 116 may be a desktop computer, a server, or any other type of computing device. Payment service system 116 may include one or more processors configured to execute software instructions stored in memory. The one or more processors may be configured to execute software instructions that when executed by the one or more processors perform known Internet-related communication, database management, financial service-based processes, and/or funds transfer functions. For instance, payment service system 116 may execute software that receives one or more usernames or user identifiers from authentication system 114, and performs funds transfer operations between accounts associated with account associated with the received usernames or user identifiers. The disclosed embodiments are not limited to any particular configuration of payment service system 116. Payment service system 116, moreover, need not be part of financial service provider 110 in all embodiments, and could be implemented as a separate system or operated by a separate entity.

Merchant 120 may be an entity that offers goods, services, and/or information, such as a retailer (e.g., Macy's®, Target®, etc.), grocery store, service provider (e.g., utility company, etc.), or any other type of entity that offers goods, services, and/or information that consumers (e.g., end-users or other business entities, such as user 131) may purchase, consume, use, etc. Merchant 120 may offer for sale one or more products of product manufacturer 120. In one example, merchant 120 may be associated with a merchant brick and mortar location(s) that a consumer (e.g., a user of client device 130) may physically visit and purchase a product or service. Merchant 120 may also include back- and/or front-end computing components that store data and execute software instructions to perform operations consistent with disclosed embodiments, such as computers that are operated by employees of the merchant (e.g., back office systems, etc.). Merchant 120 may include merchant system 122, merchant hub(s) 124, payment terminal 126, and tag(s) 128.

Merchant system 122 may include one or more computing systems, such as server(s), desktop computers, etc., that are configured to execute stored software instructions to perform operations associated with a merchant, including one or more processes associated with processing purchase transactions, generating transaction data, generating product data (e.g., SKU data) relating to purchase transactions, etc. Merchant system 122 may perform one or n ore operations consistent with the disclosed embodiments. The disclosed embodiments are not limited to any particular configuration of merchant system 122.

Merchant hub(s) 124 may include one or more devices operable to detect the presence of user items 135. For example, merchant hub(s) 124 may be configured to detect the presence of user items 135 when they are inside of a particular store or space (such as a department). Merchant hub(s) 124 may also be configured to detect the presence of user items 135 inside a particular area, such as within ten meters of hub 124. Merchant hub(s) 124 may also be configured to detect a particular location of user items 135, in order to determine whether user items 135 are within a short distance (e.g., millimeters) of a particular spot in an area (e.g., a brick-and-mortar store). Merchant hub(s) 124 may be configured to utilize technologies such as near field communication (NFC), RFID, infrared, electric field, magnetic fields, WiFi (i.e., IEEE 802.11 Bluetooth, or other technologies.

Client device 130 may be one or ore computing devices configured to perform one or more operations consistent with disclosed embodiments. Client device 130 may be a desktop computer, a laptop, a server, a mobile device (e.g., tablet, smart phone, etc.), or any other type of computing device. For exemplary purposes, aspects of the disclosed embodiments are described with reference to client device 130 as a mobile client device, such as a smart phone, tablet, or the like. As mentioned herein, however, the disclosed embodiments are not limited to such examples.

Client device 130 may include one or more processors configured to execute software instructions stored in memory, such as memory included in client device 130. Client device 130 may include software that when executed by a processor performs known Internet-related communication, content display processes, and financial service-related processes for a user of client device 130. For instance, client device 130 may execute browser or related mobile display software that generates and displays interfaces including content on a display device included in, or in communication with, client device 130. Client device 130 may be a mobile device that executes mobile device applications and/or mobile device communication software that allows client device 130 to communicate with components over network 140, and generates and displays content in interfaces via a display device included in client device 130. The disclosed embodiments are not limited to any particular configuration of client device 130. For instance, client device 130 may be a mobile device that stores and executes mobile applications that provide financial service-related functions offered by financial service provider system 112 and/or merchant system 122, such as a mobile banking application associated with a private label financial service account for checking balances, paying bills, person-to-person payments, merchant payments, financial transactions, receiving marketing messages, etc. In certain embodiments, client device 130 may be configured to execute software instructions relating to location services, such as GPS locations. For example, client device 130 may be configured to determine a geographic location of client device 130 (and associated user) and provide location data and time stamp data corresponding to the location data. Client device 130 may also store and execute applications that enable user 131 to receive a request to confirm whether the user wishes to proceed with a transaction.

User item 135 may be an item that is in close proximity to user 131. As an illustrative example, user item 135 may be any of a variety of items that contain data and are operable to transmit the data in response to a signal from another device (such as an electrical field signal or other wireless signal from hub(s) 124. In some embodiments, user item 135 could be an unpowered or "passive" device (e.g., a device that does not have a power source such as a battery) that transmits a response to a signal from another device, using the signal to transmit that response. For example, user item 135 could be a ring, a piece of jewelry, another item worn by user 131, a card (e.g., a credit card), or any other unpowered or "passive" item that emits information in response to an energy emission from another (powered) device.

The information emitted from user item 135 could be a public identifier (e.g., one that does not need to be kept secret) that, in conjunction with a private identifier (e.g., one that a user would typically try to keep secret, such as a PIN or password), is usable by one or more other systems to determine information for accomplishing a financial transaction, such as a credit card number, checking account number, or username. As one example, a public identifier associated with a user item 135 may be comprised of a public key which is used to encrypt a profile associated with the owner of user item 135. The owner of user item 135, after purchasing it, may have a private key associated with the account. In order to accomplish a transaction, the user may need to provide both a public identifier (which may be emitted by user item 135) and a private identifier (which user 131 must enter into a device such as payment terminal 126 or client device 130).

In one embodiment, merchant 120 may interface with financial service provider 110, client device 130, or user item 135 (via, e.g., merchant system 122) to perform one or more operations consistent with the disclosed embodiments.

In one aspect, merchant 120 may operate or otherwise communicate with FSP 110 via a website, API resource, or the like.

Network 140 may be any type of network configured to provide communications between components of system 100. For example, network 140 may be any type of network (including infrastructure) that provides communications, exchanges information, and/or facilitates the exchange of information, such as the Internet, a Local Area Network, wireless network (e.g., a WiFi/802.11 network), NFC, magnetic fields, Optical code scanner, infrared, or other suitable connection(s) that enables the sending and receiving of information between the components of system 100. In other embodiments, one or more components of system 100 may communicate directly through a dedicated communication link(s), such as links between financial service provider 110, merchant 120, and client device 130.

It is to be understood that the configuration and boundaries of the functional building blocks of system 100 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, financial service provider system 112 and merchant system 122 may constitute a part of components of system 100 other than those specifically described, or may constitute a part of multiple components of system 100 (i.e., a distributed system). Moreover, authentication system 114 and/or payment service system 116 may be separate and distinct from financial service provider 110 and be operated by, for example, one or more third parties having access to customer specific information.

Figure 2:
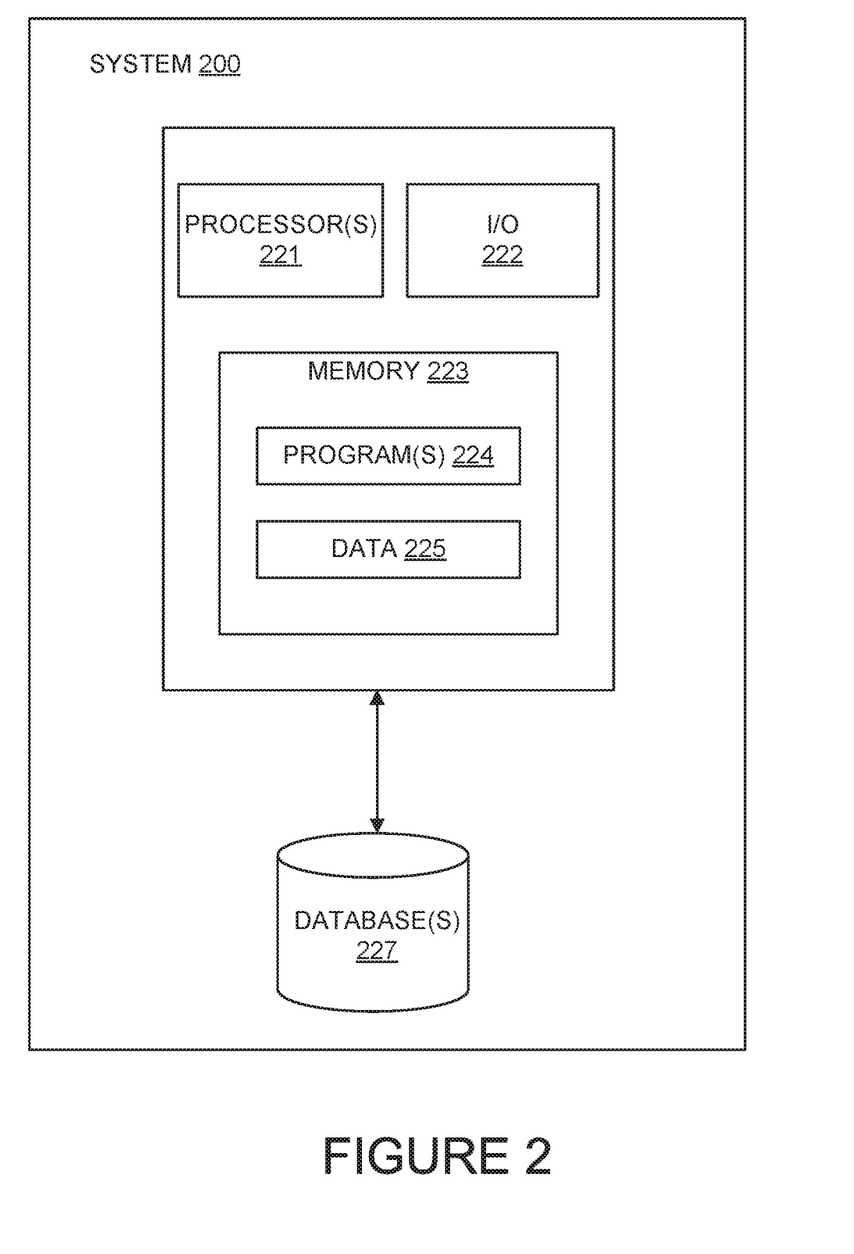
FIG. 2 is a diagram of another exemplary system, consistent with disclosed embodiments.

FIG. 2 is a diagram of another exemplary system 200, consistent with disclosed embodiments. Variations of exemplary system 300 may be used by financial service provider 110, merchant 120, and/or client device 130. In one embodiment, system 200 may comprise one or more processors 221, one or more input/output (I/O) devices 222, and one or more memories 223. In some embodiments, system 200 may take the form of a server, general purpose computer, mainframe computer, or any combination of these components. In some embodiments, system 200 may take the form of a mobile computing device such as a smartphone, tablet, laptop computer, or any combination of these components. Alternatively, system 200 may be configured as a particular apparatus, embedded system, dedicated circuit, or the like based on the storage, execution, and/or implementation of the software instructions that perform one or more operations consistent with the disclosed embodiments.

Processor 221 may include one or more known processing devices, such as mobile device microprocessors or any various other processors. The disclosed embodiments are not limited to any type of processor(s) configured in system 200.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the client device 130, or program 224 may comprise multiple programs. Memory 223 may also store data 225 that is used by one or more programs.

In certain embodiments, memory 223 may store software that may be executed by processor(s) 221 to perform one or more processes consistent with disclosed embodiments. For example, the software may be configured to operate one or more merchant hub(s) 124 usable to detect the presence of user item(s) 135 or other items in the proximity of the user.

I/O devices 222 may be one or more devices configured to allow data to be received and/or transmitted by system 200. I/O devices 222 may include one or more digital and/or analog devices that allow system 200 to communicate with other machines and devices, such as other components of system 100. For example, I/O devices 222 may include a screen for displaying communications requesting that a user confirm that he wishes to transfer funds to another user, displaying communications requesting that a user confirm that she wishes to receive funds from another user, display communications requesting that a user, or providing other information to the user, such as user 130. I/O devices 222 may also include one or more digital and/or analog devices that allow a user to interact with system 200 such as a touch-sensitive area, keyboard, buttons, or microphones. I/O devices 222 may also include other components known in the art for interacting with a user.

The components of system 200 may be implemented in hardware, software, or a combination of both hardware and software, as will be apparent to those skilled in the art. For example, although one or more components of system 200 may be implemented as computer processing instructions, all or a portion of the functionality of system 200 may be implemented instead in dedicated electronics hardware.

System 200 may also be communicatively connected to one or more database(s) 227. System 200 may be communicatively connected to database(s) 227 through network 140. Database 227 may include one or more memory devices that store information and are accessed and/or managed through system 200. By way of example, database(s) 227 may include Oracle™ databases, Sybase™ databases, or other relational databases or non-relational databases, such as Hadoop sequence files, HBase, or Cassandra. The databases or other files may include, for example; data and information related to the financial records, purchase transaction data, consumer demographics information, etc. Systems and methods of disclosed embodiments, however, are not limited to separate databases. In one aspect, system 200 may include database 227. Alternatively, database 227 may be located remotely from the system 200. Database 227 may include computing components (e.g., database management system, database server, etc.) configured to receive and process requests for data stored in memory devices of database(s) 227 and to provide data from database 227.

Figure 3:
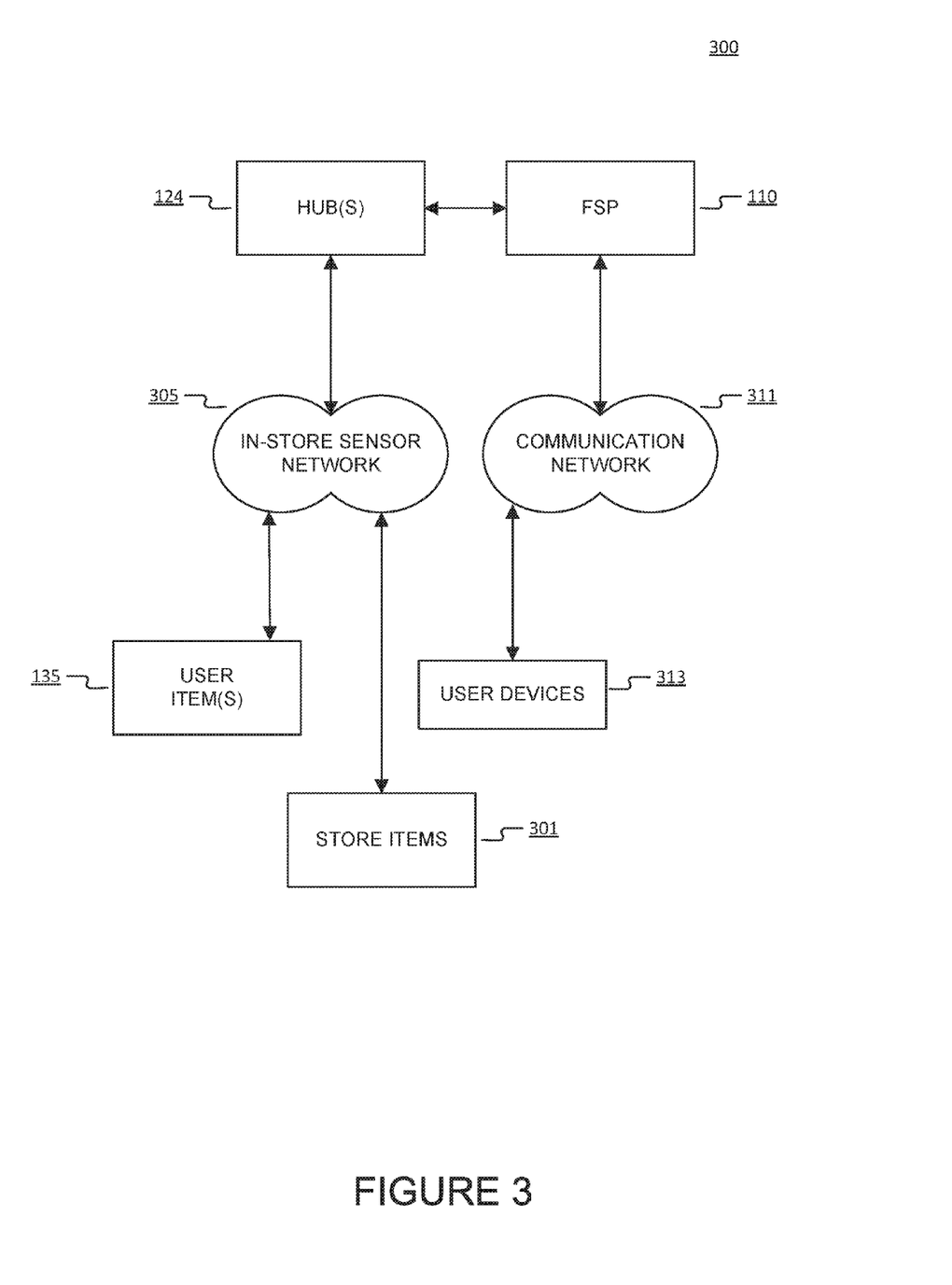
FIG. 3 is an exemplary network architecture, consistent with disclosed embodiments.

FIG. 3 is an exemplary network architecture 300, consistent with disclosed embodiments. As further described herein, merchant 120 may track the location of a user 131 (e.g., by tracking the location of user item 135 carried by user 131) and a plurality of store items 301 (e.g., by tracking the location of tags 128 attached or affixed to store items 301). For example, merchant system 120 may comprise one or more hubs 124 that communicate with and/or track the location of user item 135 and product tags 128 over an in-store hub network 240 generated by the one or more hubs 124.

In-store network 305 may comprise near field communication (NFC), RFID, infrared, electric fields, magnetic fields, Bluetooth, or any other suitable wireless technology suitable for performing operations consistent with disclosed embodiments. Hub(s) 124 may determine that a customer has interacted with a store item 301 when user item 135 and a product tag 128 become linked. In one example, hub(s) 124 may determine user item 135 and a product tags 128 are linked based on a determination that user item 135 and product tag 128 are within a predetermined proximity of each other. For example, hub(s) 124 may determine that user item 135 and product tag 128 are within 10 inches of each other, indicating that the user has picked up store item 301. In other examples, hub(s) 124 may generate an electrical, magnetic, or other field, and hub(s) 124 may determine user item 135 and product tag 128 are linked based on changes to the field with respect to user item 135 and store item 301 caused by user 131 touching store item 301. According to some embodiments, hub(s) 124 may communicate with merchant server 122 over a Local Area Network (LAN) or direct connection separate from in-store hub network 240 (such as communication network 311). Hub(s) 124 may also communication indirectly or directly with user devices 313 over a communication network 311 and/or FSP 110.

Upon a determination that user 131 has interacted with a store item 301 and/or another user 131, hub(s) 124 may transmit information associated with user item(s) 135 and any store item(s) 301 (identified by merchant system 120 from product tag 128) to FSP system 112 via, e.g., merchant server 122. FSP system 112 may communicate information to user devices 313 via, e.g., communication network 311.

Figure 4A:
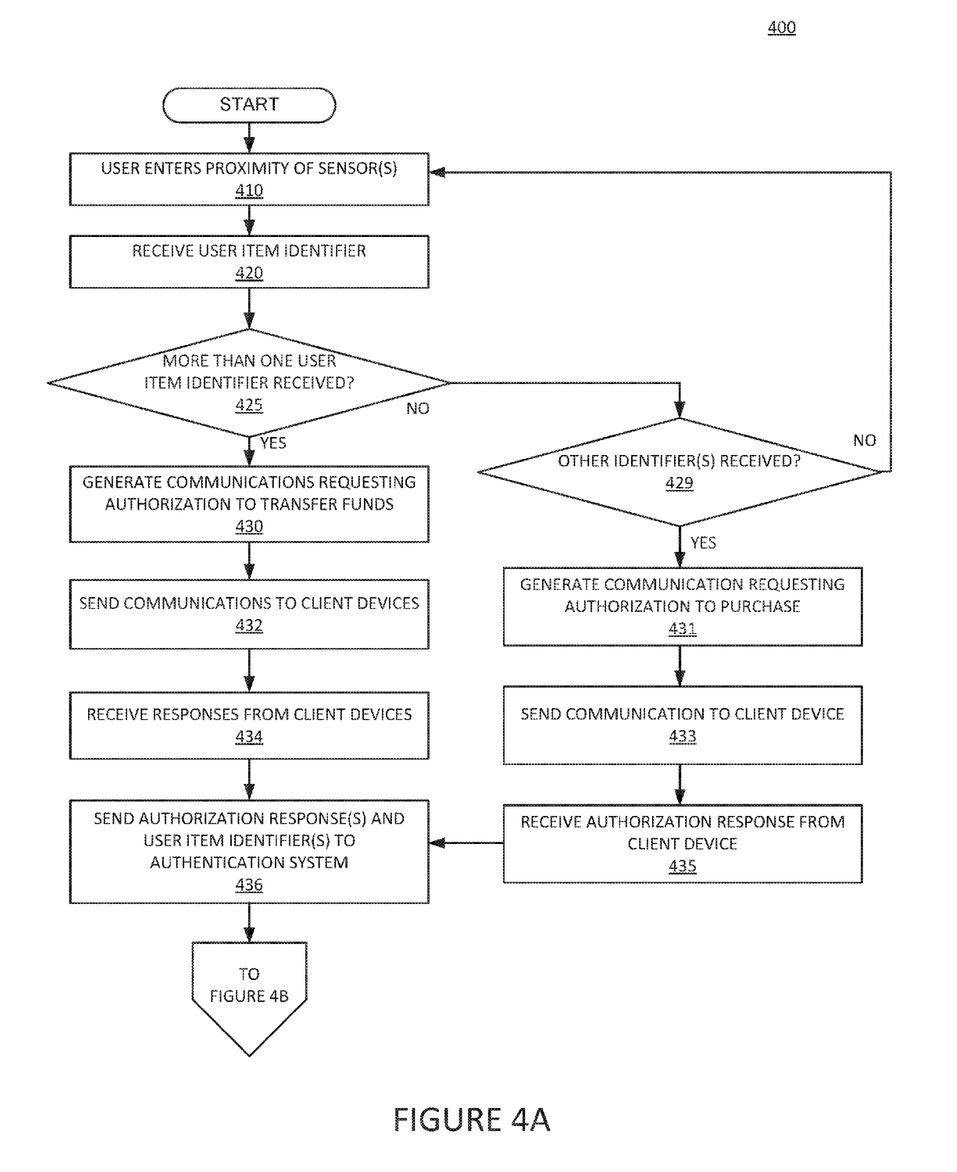
FIG. 4A is a flow chart of an exemplary proximity-based data transfer process, consistent with disclosed embodiments.

FIG. 4A is a flow chart of an exemplary proximity-based sensing process 400, consistent with disclosed embodiments.

In step 410, user 131 enters the proximity of a sensor such as a merchant hub 124. Entering the proximity of merchant hub 124 may constitute entering a particular physical location (e.g., a store or a department within a store) or entering an area surrounding merchant hub 124 (e.g., a ten-foot radius surrounding merchant hub 124 or 50% of the maximum range of the technology used by merchant hub 124).

In some embodiments, merchant hub 124 may determine that user 131 has brought client device 130 into the proximity of merchant hub 124, using one or more sensors attached to or otherwise in operative communication with client device 130. For example, client device 130 may utilize sensors configured to operate using GPS, Bluetooth, Bluetooth Low Energy (BLE), Wi-Fi, or other wireless technologies, and send data associated with those sensors to enable merchant hub 124 to determine whether client device 130 is within a particular distance of merchant hub 124.

In step 420, merchant hub 124 receives at least one identifier from user item 135. As explained above, merchant hub 124 may receive the identifier as a result of emitting energy into a physical space. User item 135 may receive the energy and respond as part of a response to the emitted energy.

In step 425, merchant hub 124 determines whether more than one user item identifier was received. For example, if merchant hub 124 receives a single user identifier from a sensor, merchant hub 124 may be configured to determine that only a single user is attempting to complete a transaction (e.g., a purchase at a point-of-sale or other merchant system). If only a single user identifier is received, the process continues to step 429. If, however, more than one user identifier is received from a single sensor, the process may continue to step 430.

In step 429, merchant hub 124 may determine whether store item(s) 301 are also within the presence of user 131. For example, merchant hub may utilize the same technology used to detect the presence of user item 135 (and/or a different technology) to detect identifiers affixed/attached to store item(s) 301 that are within a certain short distance (e.g., two feet) of user 131. If merchant hub 124 determines that user 131 has store item(s) 301 in her possession, the process may continue to step 431. Otherwise, the process may return to step 410.

In step 431, merchant hub 124 generates a communication requesting authorization to purchase store item(s) 301 detected as being in the presence of user 131. Step 431 may also include other processes, such as a lookup to determine the prices of each item, the name of each item, or any discounts associated with each item; a reduction in prices for each item for sale (based on coupons, discounts, "frequent buyer" cards, or other memberships or promotions); a determination of a total price for all items; or the like. The communication may include a listing of store item(s) 301 (including, for example, names, prices, or discounts) and a request to confirm that the user wishes to purchase the items.

Figure 5A:
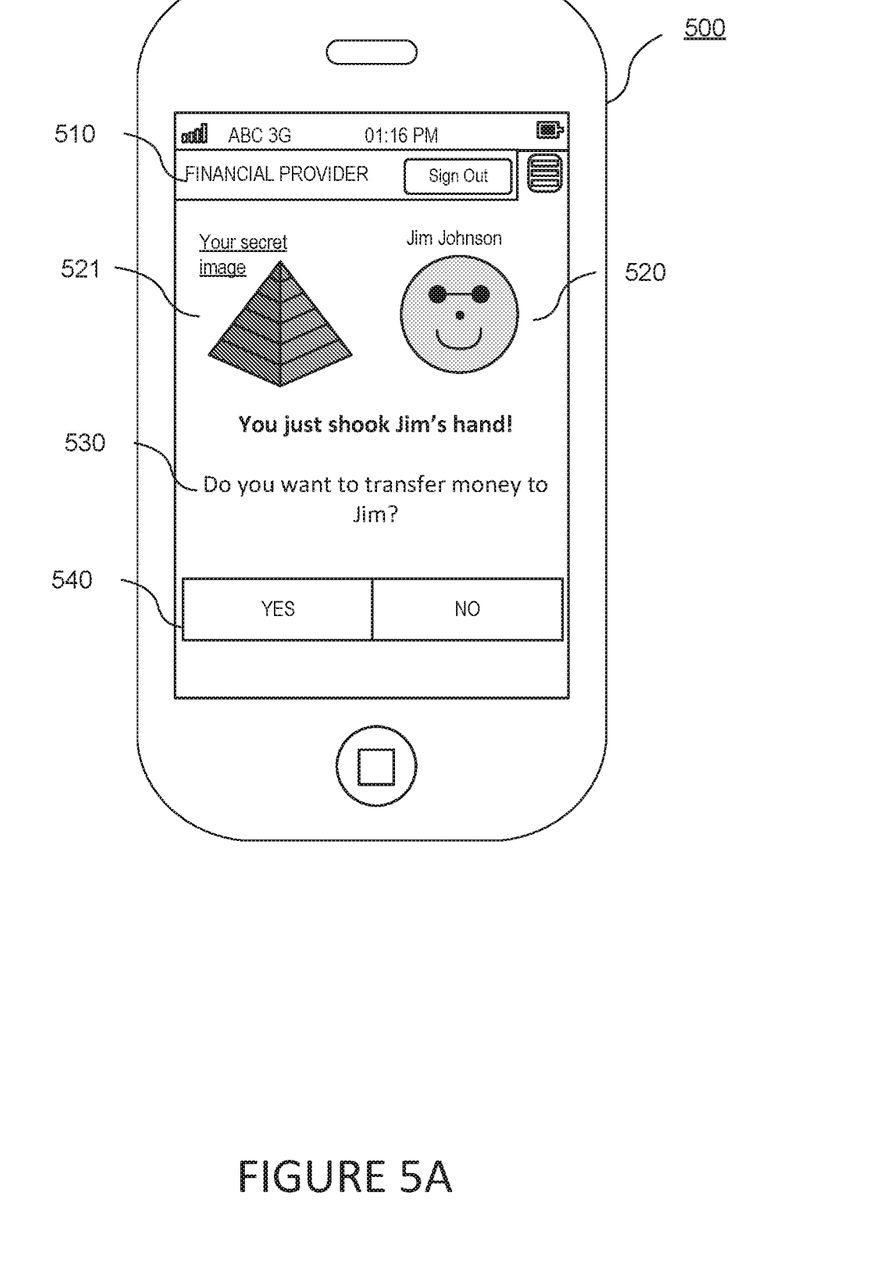
FIG. 5A is a diagram of an exemplary interface displaying a request to confirm a funds transfer, consistent with disclosed embodiments.

In step 433, merchant hub 124 may send the communication to an electronic device associated with user 131, such as client device 130. For example, merchant hub 124 may send the communication as an email, a text message (e.g., MMS, SMS, etc.), or other communication to request authorization from user 131 to proceed with the transaction. The communication may be displayed on client device 130 in an attempt to receive an authorization from user 131 to proceed with the transaction. (One exemplary display of such a communication is depicted in FIG. 50, described below.)

In step 435, merchant hub 124 may receive an authorization response from client device 130. The authorization response may include authorization information and/or private information. Authorization information may include a secret identifier known and/or chosen by user 131. The secret identifier (such as a symbol or picture) may be used to reassure user 131 that the communication is actually from a trusted party (e.g., merchant hub 124). The private information for example, may include a PIN, a password, biometric data, the answer to a security question, or other information. This private information may be used in combination with the identifier of user item 135 by another device to determine information about user 131 (e.g., a credit card number, a checking account number, a username, a user identifier, or the like).

Going back to step 425, if merchant hub 124 detects multiple user identifiers in close proximity to one another (e.g., within two feet of one another) or detects that two or more user item(s) 135 that create a circuit with one another (e.g., when two users 131 shake hands, creating an electrical circuit), the process may continue to step 430. Merchant hub 124 may be configured to detect, based on the circuit created between two or more user items 135, that the identifiers were transmitted by the two or n ore user items 135.

In step 430, merchant hub 124 generates communications requesting authorization to transfer money between the users whose user items 135 were detected. Step 430 may also include other processes, such as a lookup to determine the users associated with each user item 135 or an identifier (such as a phone number or email address) for each client device 130 associated with each user; a determination of past funds transfers between each user; or the like. Each communication received by a client device 130 for display to user 131 may include the other user's name, a picture of the other user's face, a request to confirm the funds transfer, a listing of past funds transfers with the other user, or the like.

In step 432, merchant hub 124 may send each respective communication to an electronic device associated with user 131, such as client device 130. For example, merchant hub 124 may send the communication as an email, a text message (e.g., MMS, SMS, etc.), or other communication to request authorization from each user 131 to proceed with the transaction. The communication may also include a request for user 131 to indicate whether that user is receiving funds or transferring funds (and if so, how much to transfer to one or more other users). The communication may be displayed on each client device 130 in an attempt to receive an authorization from each user 131 to proceed with the transaction. (One exemplary display of such a communication is depicted in FIG. 5A, described below.)

In step 434, merchant hub 124 may receive an authorization response from client device 130. The authorization response may include authorization information and/or private information. Authorization information may include a secret identifier known and/or chosen by user 131. The secret identifier (such as a symbol or picture) may be present to reassure user 131 that the communication is actually from a trusted party (e.g., merchant hub 124). The private information for example, may include a PIN, a password, biometric data, the answer to a security question, or other information. This private information may be used in combination with the identifier of user item 135 by another device to determine information about user 131 (e.g., a credit card number, a checking account number, a username, or the like).

Regardless of whether one or more user item identifiers were received in step 425, in step 436, merchant hub 124 sends any received authorization response(s) and any identifier(s) (such as identifiers of store item(s) 301, user item(s) 135, or the like) to authentication system 114. Authentication system 114 receives the identifier(s) and authorization response(s) in step 442 on FIG. 4B.

Figure 4B:
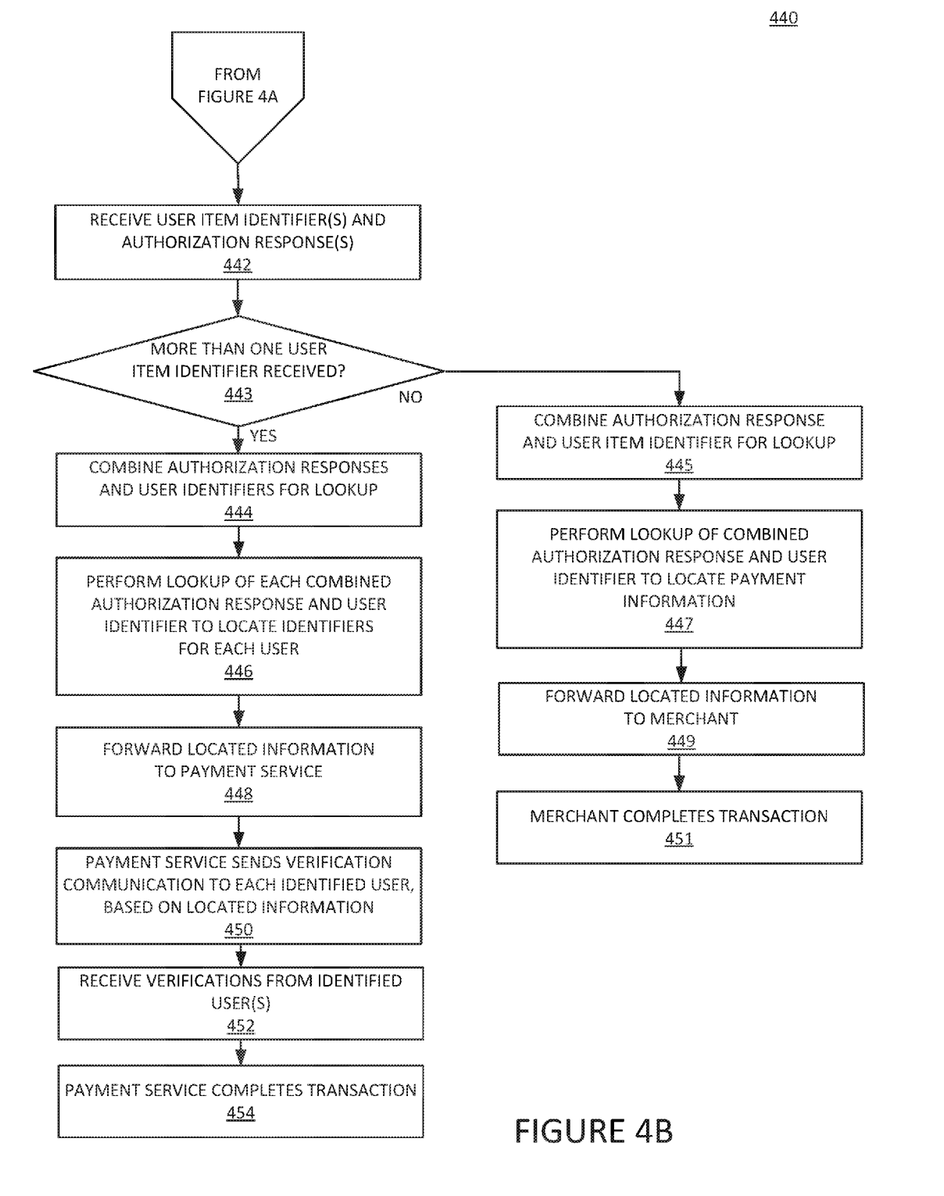
FIG. 4B is a flow chart of an exemplary proximity-based data transfer process, consistent with disclosed embodiments.

FIG. 4B is a flow chart of an exemplary proximity-based sensing process 440, consistent with disclosed embodiments. In step 442, authentication system 114 receives one or more identifier(s) (such as user item 135 identifiers and/or identifiers of store item(s) 301) and one or more authorization response(s) (for example, from one or more user device(s) 130). In step 443, authentication system 114 determines whether it received more than one user item identifier. If authentication system 114 received only one user item identifier (indicating that only a single user is in the proximity of a particular sensor), process 440 may proceed to step 445.

In step 445, authentication system 114 may combine the received authorization response and received user item identifier. In step 447, authentication system 114 may utilize the combined received authorization response and received user item identifier in order to locate information associated with the user item identifier. For example, the received authorization response may constitute a "private key" that is only given to an owner of the user item identifier. The private key may be associated with a user profile associated with that owner. The profile may include payment information. Authentication system 114 may use the private key, in conjunction with the user item identifier, to decrypt or unlock a user profile, and determine a credit card number, a checking account number, a username corresponding to a payment service, or other information usable to effect a transaction.

In step 449, authentication system 114 may send the located information to merchant 120 to enable merchant 120 to accomplish the transaction. In step 451, merchant 120 completes the transaction using the information received from authentication system 114. For example, merchant 120 may have determined a price to charge user 131 based on the identifiers of items in the user's possession, and may utilize a received credit card number to generate the appropriate signals necessary to initiate a transaction.

Initiating and completing the transaction (as in steps 429, 431, 433, 435, 445, 447, 449, and 451) may be accomplished in a number of ways. For example, user 131 may walk to a particular location in a brick-and-mortar store (e.g., a "checkout zone") indicating that user 131 is ready to checkout and pay for goods that user 131 has in a cart or basket that is in close proximity to the user. Client device 130 may then receive a receipt listing the total amount of the goods. User 131 may be prompted on client device 130 to accept the total amount of the goods that are in the possession of user 131. Once the user accepts the purchase total (e.g., by entering a PIN or password), client device 130 may receive a receipt (via, e.g., push notification) indicating that the purchase was successful. User 131 may then leave the store. As another example, user 131 may initiate a checkout procedure using client device 130. For example, user 131 may press a button that indicates a desire to determine a total price for the items in possession. Client device 130 may then receive a receipt listing the total amount of the goods. User 131 may be prompted on client device 130 to accept the purchase for the total amount of the goods in possession of user 131. Once the user accepts the purchase total (e.g., by entering a PIN or password), client device 130 may receive a receipt (via, e.g., push notification) indicating that the purchase was successful. User 131 may then leave the store.

Going back to step 443, if authentication system 114 determines that more than one user item identifier was received, authentication system 114 may determine that more than one user would like to initiate a transaction, and may proceed to step 444.

One exemplary transaction between more than one user would be a funds transfer. For example, if three friends go to dinner and a first friend does not have enough money to pay for his share, his dinner companions may each cover half of the first friend's share. The first friend could initiate one or more transactions to pay back his dinner companions. In this exemplary transaction each user may be required to confirm a respective desire to accomplish a funds transfer transaction, either as a recipient of funds or as a sender of funds.

In step 444, authentication system 114 may combine each respective authorization response and received user item identifier.

In step 446, authentication system 114 may utilize the combined received authorization response and received user item identifier in order to locate information associated with the user item identifier. For example, the received authorization response may constitute a "private key" that is only given to an owner of the user item identifier. The private key may be associated with a user profile associated with that owner. The profile may include payment information. Authentication system 114 may use the private key, in conjunction with the user item identifier, to decrypt or unlock a user profile, and determine a credit card number, a checking account number, a username corresponding to a payment service, or other information usable to effect a transaction.

In step 448, authentication system 114 may send the located information to payment service system 116 to enable payment service system 116 to accomplish the transaction. In step 450, payment service system 116 may generate one or more verification communications for each user identified using the located information received in step 448. Each verification communication could include at least one of a request to confirm that a user wishes to transfer funds to another user, a request to confirm that a user wishes to receive funds from another user, or a request for authorization information (e.g., a PIN or password), or the like. Step 450 also represents payment service system 116 sending the verification communications to each user.

In step 452, payment service system 116 may receive responses to the one or more verification communications sent in step 450. If each user responded to the verification communication with an affirmative response (e.g., "Yes" or "I wish to confirm this transaction") process 440 may continue to step 454, where payment service system 116 may complete the transaction. Completing the transaction may involve one or more of: determining account details for an account of a user that has agreed to pay another user, determining account details for an account of a user that has agreed to receive funds from another user, submitting a debit instruction to a bank holding the account of a user that has agreed to pay another user, submitting a credit instruction to a bank holding the account of a user that has agreed to receive funds from another user, modifying balances of accounts controlled, held, or otherwise operated by payment service system 116, or the like.

FIG. 5A is a diagram of an exemplary client device 500 including an interface displaying authorization requests, consistent with disclosed embodiments. For example, client device 500 may include an interface (via, e.g., an app associated with financial service provider 110) that includes one or more images or blocks of text including, for example, the provider of a user's financial account (area 510), a second user with which the user may wish to transact (area 520), or a secret image that reassures the user that the interface is legitimate and is not a scam or a "phishing" attempt (area 521), or an indication of a transaction initiated based on an action the user took, such as shaking the hand of a second user (area 530). Client 500 may also include buttons 540 which enable the user to either confirm or deny the authorization request. If a user presses the "YES" button on buttons 540, the user may be shown a new interface (not shown) that requests information concerning the funds transfer, such as an amount, a text area for a "memo" or a note, a desired recurrence for the funds transfer, a date on which to effect the funds transfer, authorization information (such as a password or a PIN), or the like. If the user presses the "NO" button on buttons 540, client device 500 may transmit an indication that the user has declined the transaction.

Figure 5B:
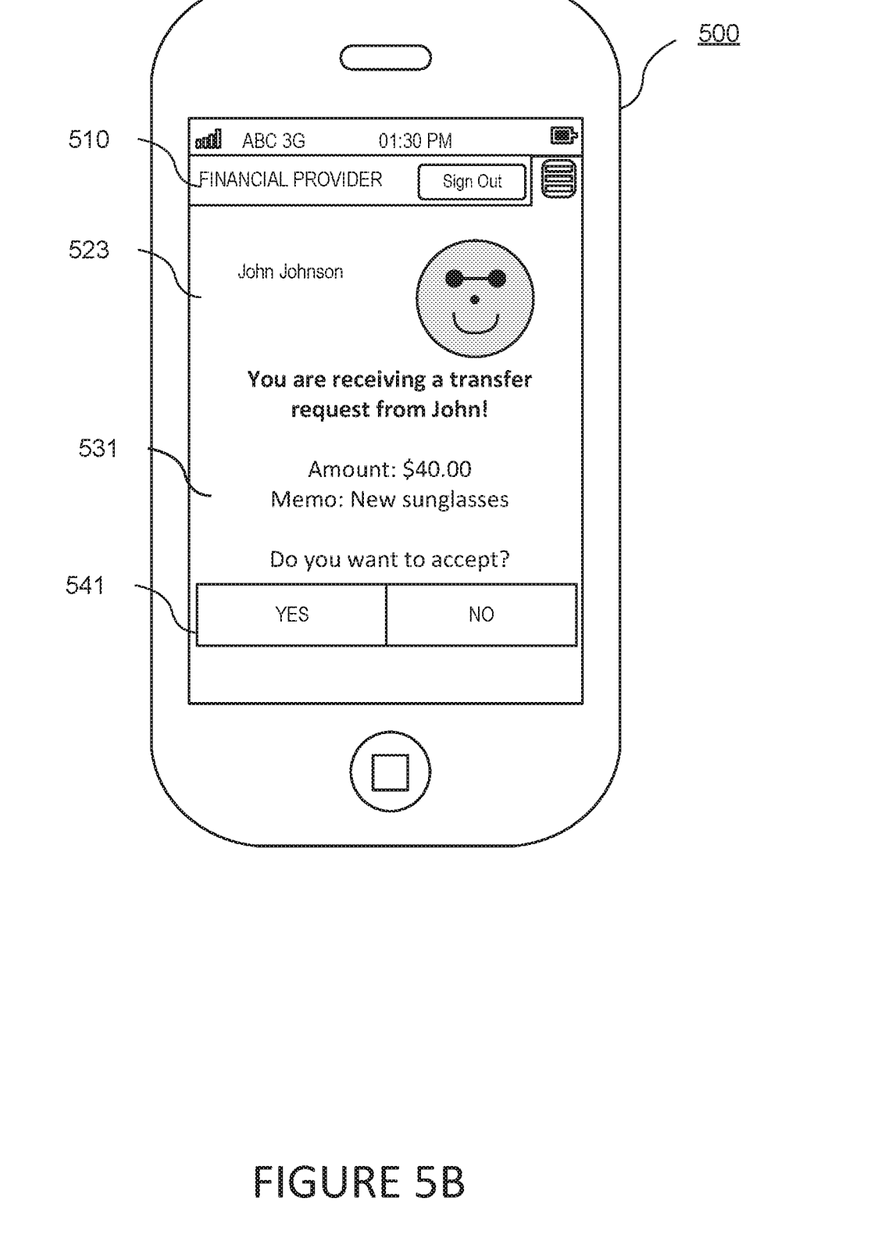
FIG. 5B is a diagram of an exemplary interface displaying a request to confirm receipt of a funds transfer, consistent with disclosed embodiments.
Figure 5C:
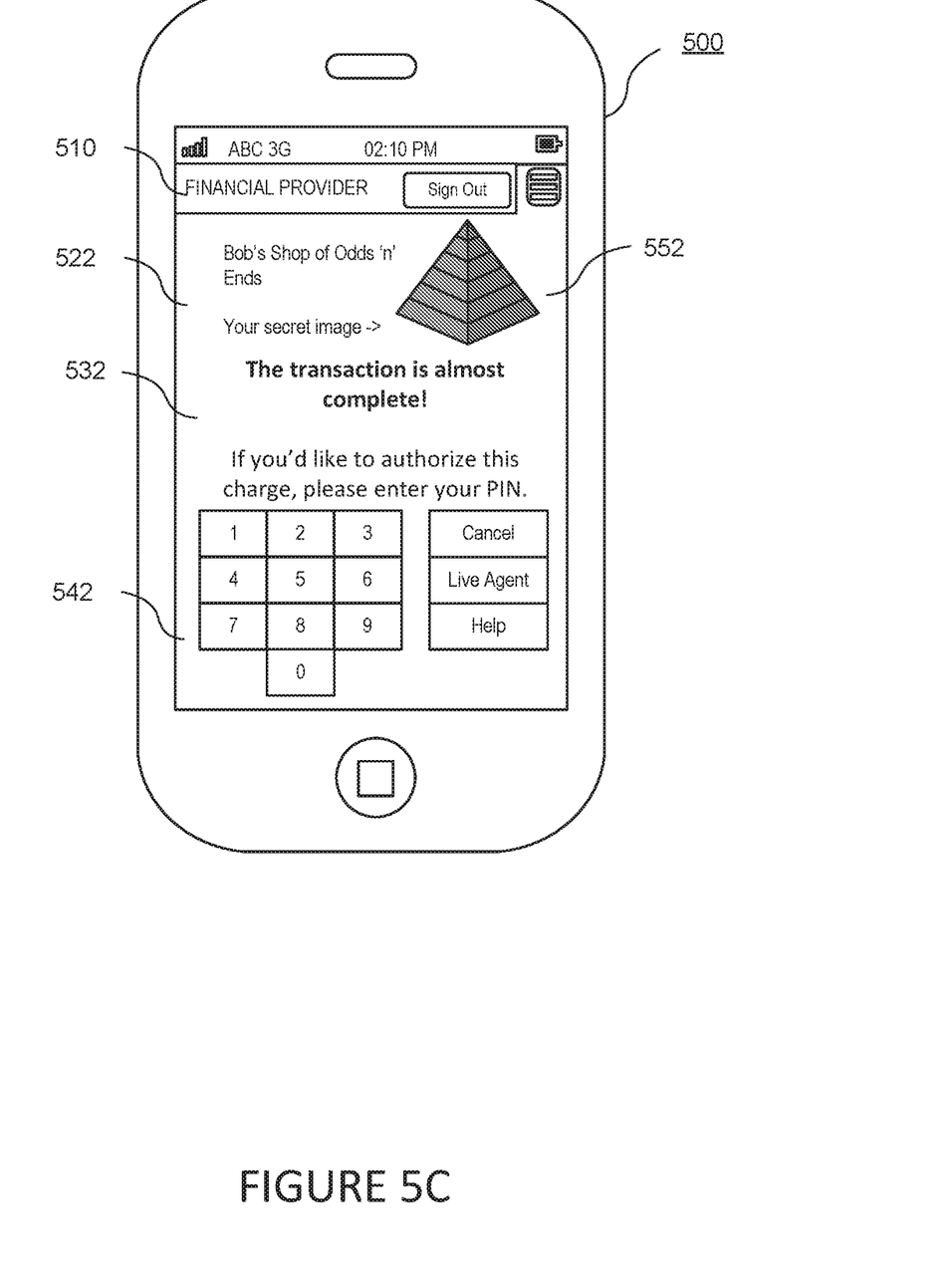
FIG. 5C is a diagram of an exemplary interface displaying a request to confirm a transaction, consistent with disclosed embodiments.

FIG. 5B is a diagram of an exemplary client device 500 including an interface displaying authorization requests, consistent with disclosed embodiments. For example, client device 500 may include an interface (via, e.g., an app associated with financial service provider 110) that includes one or more images or blocks of text including, for example, the provider of a user's financial account (area 510), a second user from which the user may wish to receive funds (area 523), or an indication of a transaction initiated based on an action the user took, such as shaking the hand of a second user (area 531). Client 500 may also include buttons 541 which enable the user to either confirm or deny the authorization request. If a user presses the "YES" button on buttons 541, the user may be shown a new interface that indicates, for example, whether the transaction was successful, when the user can expect the funds to become available for use, authorization information (such as a password or a PIN), or the like. If the user presses the "NO" button on buttons 541, client device 130 may transmit an indication that the user has declined the transaction.

FIG. 5C is a diagram of an exemplary client device 500 including an interface displaying authorization requests for a purchase, consistent with disclosed embodiments. For example, client device 500 may include an interface (via, e.g., an app associated with financial service provider 110) that includes one or more images or blocks of text including, for example, the provider of a user's financial account (area 510), a merchant to which the user may wish to send funds (area 522), a secret image that ensures the user that the interface is legitimate and is not a scam or a "phishing" attempt (area 552), an indication of a transaction initiated based on an action the user took, such as approaching a sensor while holding both of a user item 135 and store item(s) 301 (area 532). Client 500 may also include keypad 542 which enables the user to enter authorization information (such as a password or a PIN), to cancel the transaction (by pressing "Cancel"), to obtain live assistance with the transaction (by pressing "Live Agent"), to obtain assistance in using the interface (by pressing "Help"), or the like. If a user enters a PIN on exemplary keypad 542, the user may be shown a new interface (not shown) that requests information concerning the funds transfer, such as a tip amount, a desired recurrence for the purchase, a date on which to effect the purchase, or the like. The device may then send the PIN or other authorization information to another device (such as authentication system 114 or merchant hub 124).

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

The invention claimed is:

1. A system for managing transactions, comprising:
a sensor, comprising:
a first storage device storing instructions; and
a first processor executing the first storage device instructions to perform operations comprising:
receiving a first signal from an item associated with a user, the first signal comprising a unique identifier;
receiving a second signal from a product, the second signal comprising a product identifier;
detecting, based on the first and second signals, initiation of a transaction of the product by detecting;
that the item associated with the user is within a predefined proximity to the sensor; and
that the item associated with the user and the product are within a predefined proximity to one another;
upon detecting initiation of a transaction of the product, sending an authorization request, to an electronic device associated with the user, requesting that the user authorize a purchase of the product;
receiving a user response to the authorization request; and
sending the user response over a network, and
an authentication system comprising:
a second storage device storing instructions; and
a second processor executing the second storage device instructions to perform operations comprising:
receiving, from the sensor, the user response and the unique identifier;
identifying payment information associated with the user based on the user response and the unique identifier; and
sending the identified payment information to a transaction processing system for completing the purchase of the product.

2. The system of claim 1, wherein the transaction processing system is one of a payment service system or a merchant system.

3. The system of claim 1, wherein receiving the unique identifier comprises receiving the unique identifier by at least one of electric field communication, magnetic field communication, Near Field Communication, RFID, 802.11 wireless, or Bluetooth.

4. The system of claim 1, wherein the unique identifier comprises a public identifier and a private identifier.

5. The system of claim 1, wherein identifying payment information comprises decrypting an encrypted profile associated with the user.

6. The system of claim 1, wherein the item is at least one of a ring, a piece of jewelry, a card, or a wearable item.

7. The system of claim 1, wherein receiving the unique identifier comprises receiving the unique identifier when the item is in a predefined proximity to the sensor.

8. The system of claim 1, wherein the authorization request comprises a request to confirm that the user wishes to purchase the product.

9. The system of claim 1, wherein the user response comprises at least one of a PIN, a password, biometric data, or a response to a security question.

10. The system of claim 1, wherein the sensor operations further comprise:
sending a signal that, when received by the item associated with the user, triggers the item to respond.

11. The system of claim 10, wherein the sent signal empowers the item associated with the user.

12. The system of claim 1, wherein the sensor operations further comprise:
sending a signal to detect existence of the item associated with the user.

13. The system of claim 1, wherein the authorization request comprises at least one of a price of the product, a name of the product, or a discount associated with the product.

14. The system of claim 1, wherein the received response comprises private information, wherein the private information comprises at least one of a PIN, a password, biometric data, or an answer to a security question.

15. The system of claim 1, wherein the sensor operations further comprise:
sending a signal that, when received by the product, triggers the product to respond.

16. The system of claim 15, wherein the sent signal provides power to the product.

17. The system of claim 1, wherein the operations further comprise:
sending a signal that, when received by the item associated with the user, triggers the item to respond.

18. The system of claim 17, wherein the sent signal provides power the item associated with the user.

19. A non-transitory computer readable medium storing instructions that, when executed by a processor, cause the processor to perform operations comprising:
receiving a first signal from an item associated with a user, the first signal comprising a unique identifier;
receiving a second signal from a product, the second signal comprising a product identifier;
detecting, based on the first and second signals, initiation of a transaction of the product by detecting:
that the item associated with the user is within a predefined proximity to a sensor; and
that the item associated with the user and the product are within a predefined proximity to one another;
upon detecting initiation of a transaction of the product, sending an authorization request, to an electronic device associated with the user, requesting that the user authorize a purchase of the product;
receiving a user response to the authorization request; and
sending the user response over a network.

20. The medium of claim 19, wherein the unique identifier is received by at least one of electric field communication, magnetic field communication, Near Field Communication, RFID, 802.11 wireless, or Bluetooth.

* * * * *